(12) United States Patent
Kim et al.

(10) Patent No.: US 11,885,981 B2
(45) Date of Patent: Jan. 30, 2024

(54) CAMERA MODULE

(71) Applicant: LG INNOTEK CO., LTD., Seoul (KR)

(72) Inventors: Chul Kim, Seoul (KR); Jae Wook Kwon, Seoul (KR); Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 520 days.

(21) Appl. No.: 17/254,642

(22) PCT Filed: Jun. 21, 2019

(86) PCT No.: PCT/KR2019/007475
§ 371 (c)(1),
(2) Date: Dec. 21, 2020

(87) PCT Pub. No.: WO2019/245315
PCT Pub. Date: Dec. 26, 2019

(65) Prior Publication Data
US 2021/0149086 A1      May 20, 2021

(30) Foreign Application Priority Data

Jun. 22, 2018   (KR) .................. 10-2018-0072078

(51) Int. Cl.
*G02B 3/12* (2006.01)
*G01S 17/894* (2020.01)
*G02B 26/00* (2006.01)
*G03B 17/12* (2021.01)
*H04N 23/55* (2023.01)

(52) U.S. Cl.
CPC .............. *G02B 3/12* (2013.01); *G01S 17/894* (2020.01); *G02B 26/004* (2013.01); *G03B 17/12* (2013.01); *H04N 23/55* (2023.01)

(58) Field of Classification Search
CPC ................................. H04N 23/55; G02B 3/12
USPC ......................................................... 348/335
See application file for complete search history.

(56) References Cited

U.S. PATENT DOCUMENTS

2008/0267603 A1   10/2008 Jung et al.
2012/0113525 A1   5/2012 Kong et al.
2012/0154537 A1   6/2012 Chang et al.

FOREIGN PATENT DOCUMENTS

| JP | 2000039608 | * | 2/2000 |
| JP | 2010-54864 | A | 3/2010 |
| KR | 2005-0096686 | A | 10/2005 |
| KR | 10-0771817 | B1 | 10/2007 |
| KR | 10-0843473 | B1 | 7/2008 |

(Continued)

*Primary Examiner* — Joel W Fosselman
(74) *Attorney, Agent, or Firm* — Birch, Stewart, Kolasch & Birch, LLP

(57) ABSTRACT

A camera module according to an embodiment of the present invention comprises: a substrate; a light source disposed on the substrate to output light; a first optical member for, when the light is input, diffusing and outputting the light; and a second optical member including a first liquid and a second liquid having a different refractive index from the first liquid, and when the diffused light is input, refracting and outputting the diffused light according to an interface which is formed between the first liquid and the second liquid and is changed according to applied voltage.

10 Claims, 10 Drawing Sheets

(56) References Cited

FOREIGN PATENT DOCUMENTS

| | | | |
|---|---|---|---|
| KR | 2010-0109729 | A | 10/2010 |
| KR | 10-1262874 | B1 | 5/2013 |
| KR | 10-2013-0112541 | A | 10/2013 |
| KR | 10-2017-0005649 | A | 1/2017 |
| KR | 10-1694797 | B1 | 1/2017 |
| KR | 10-2017-0026002 | A | 3/2017 |
| TW | 201807436 | * | 3/2018 |

* cited by examiner

[FIG.1]
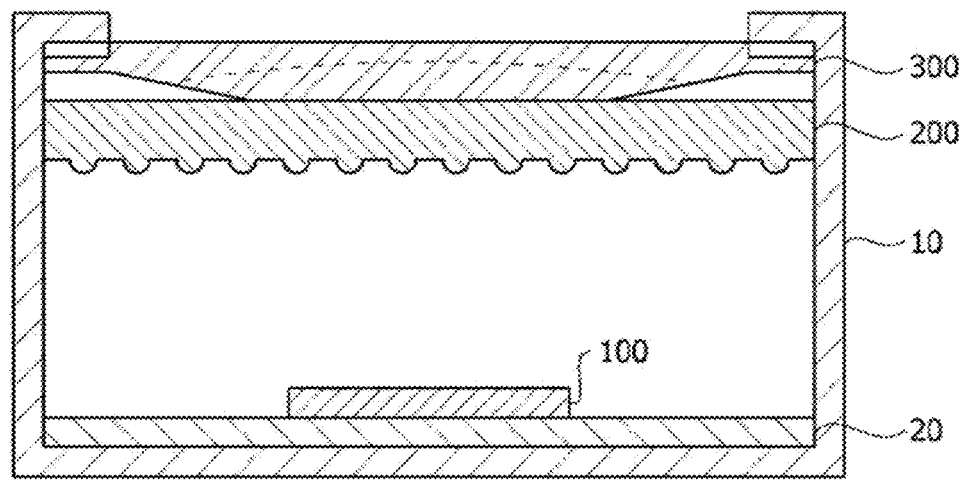
[FIG.2]
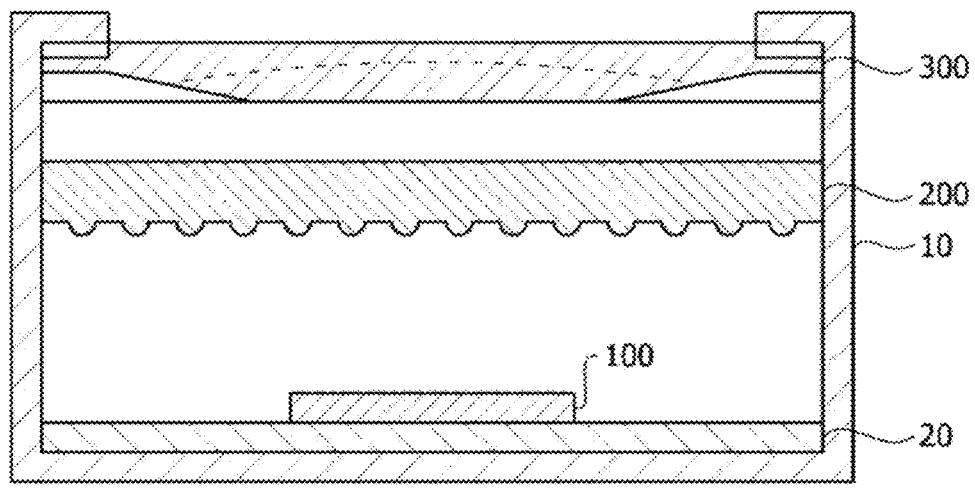

[FIG.3]
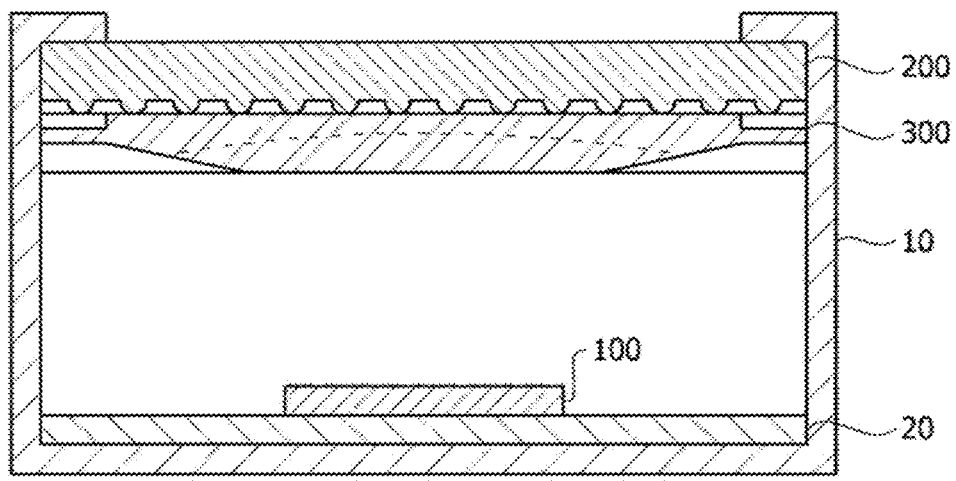
[FIG.4]
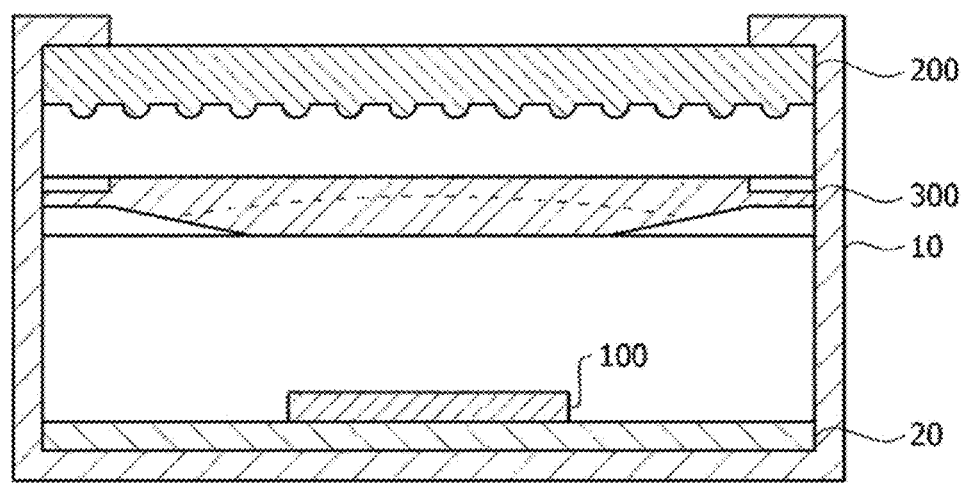

[FIG.5]
100
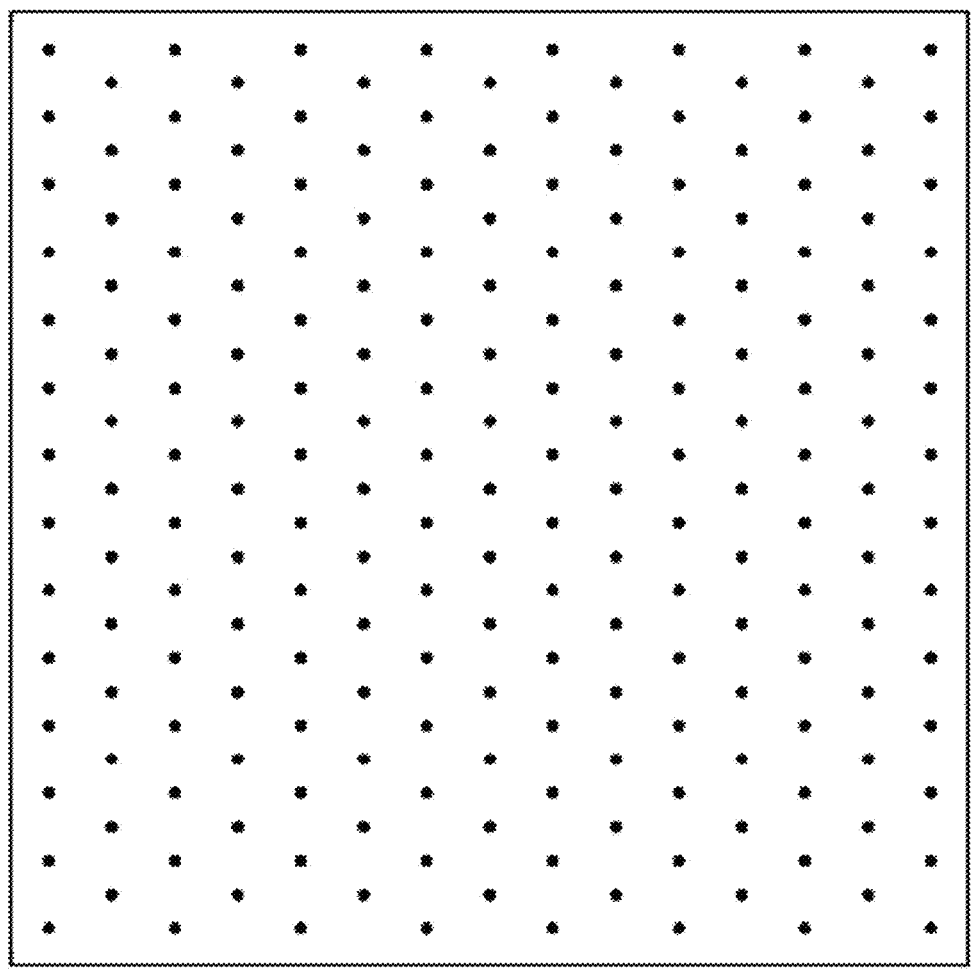

[FIG.6]
200
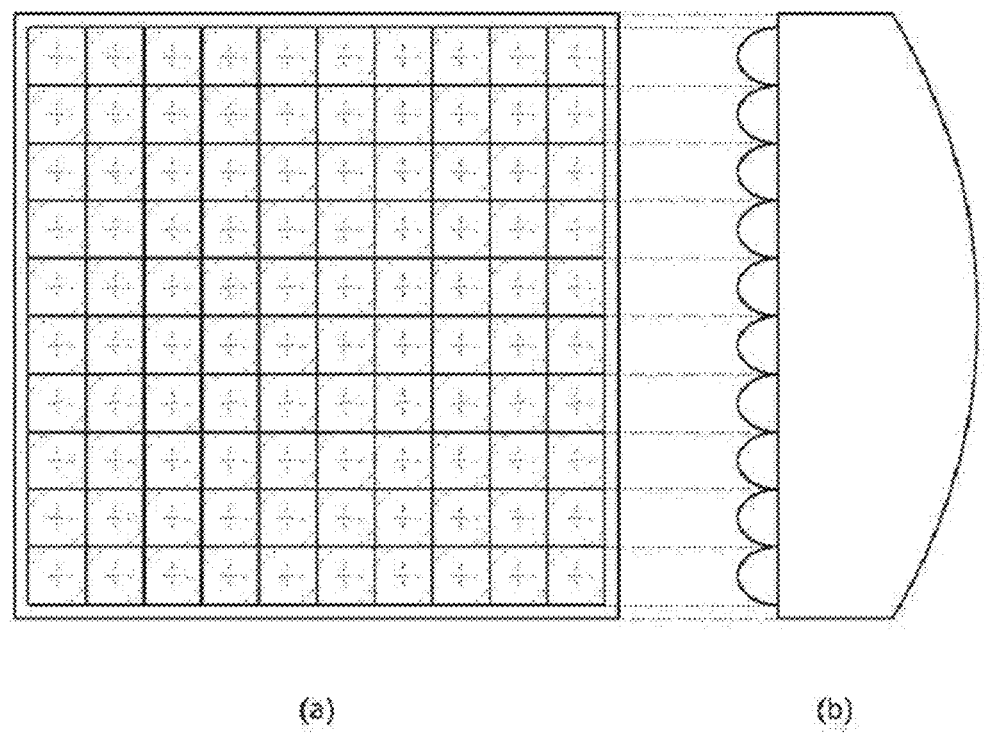
(a)          (b)

[FIG.7]
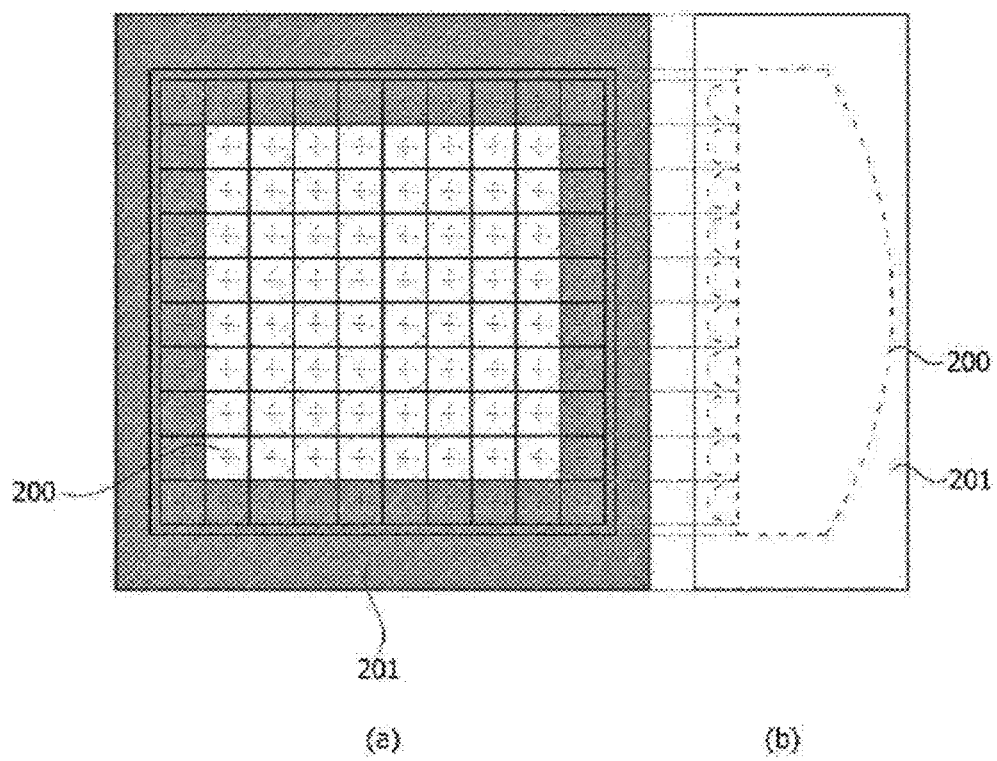
(a) (b)

[FIG.8]
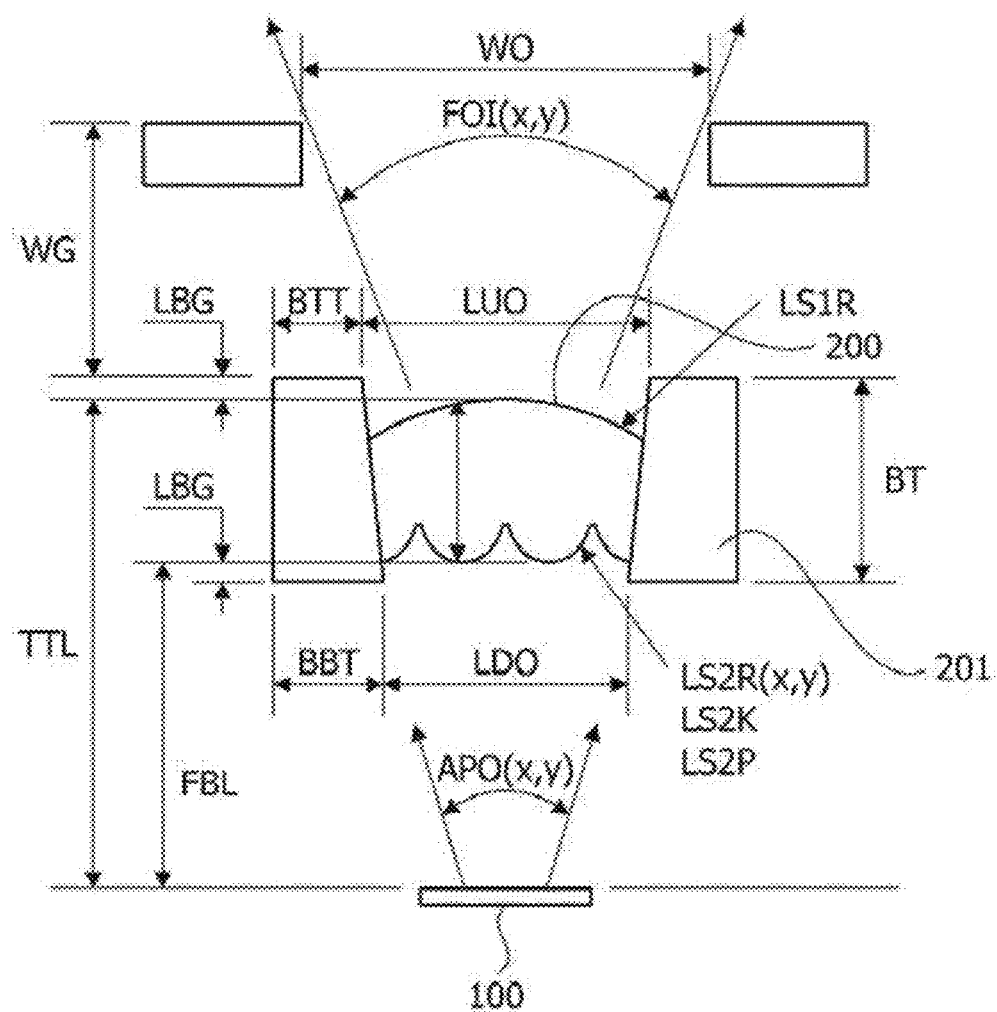

[FIG.9]
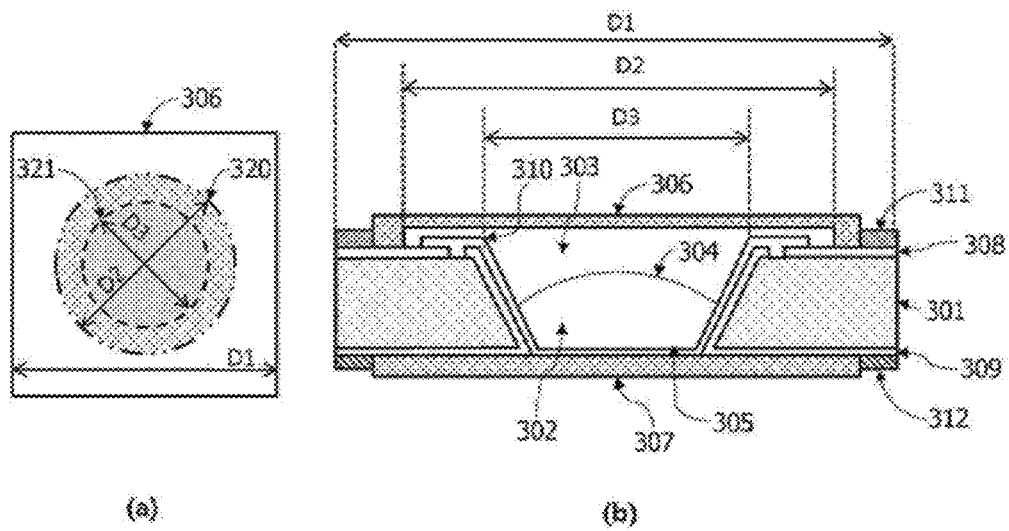
(a)　　　　　　(b)
[FIG.10]
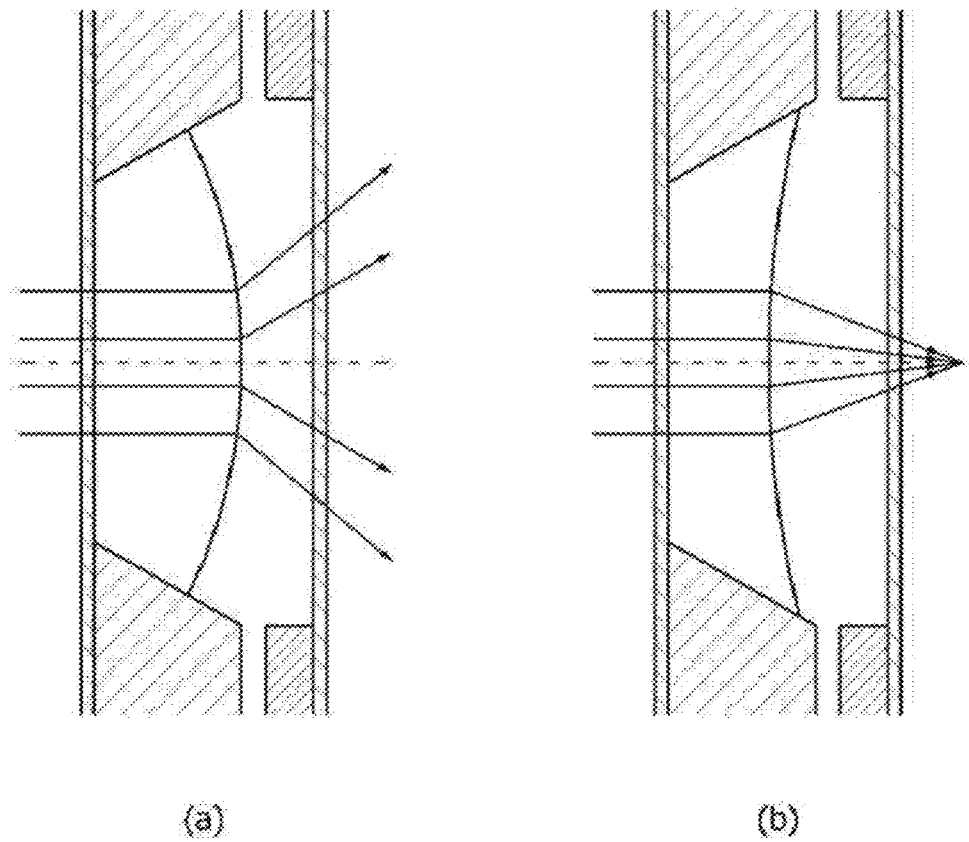
(a)　　　　　　(b)

[FIG.11]
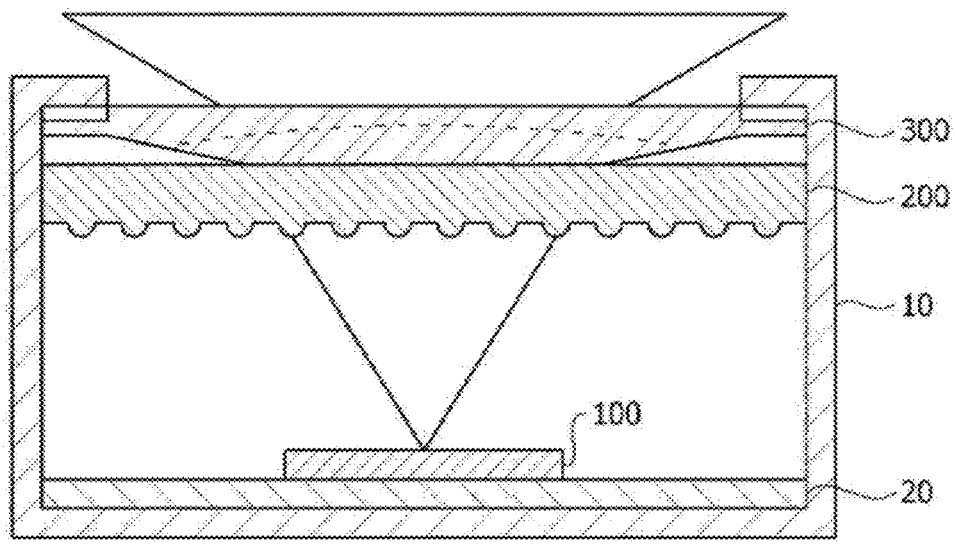
[FIG.12]
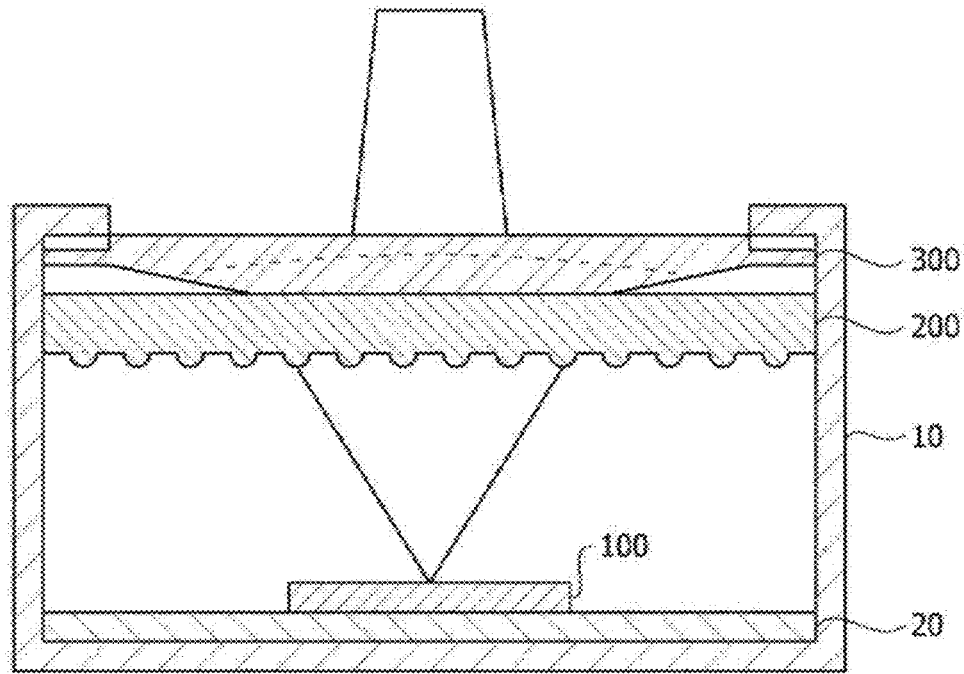

[FIG.13]
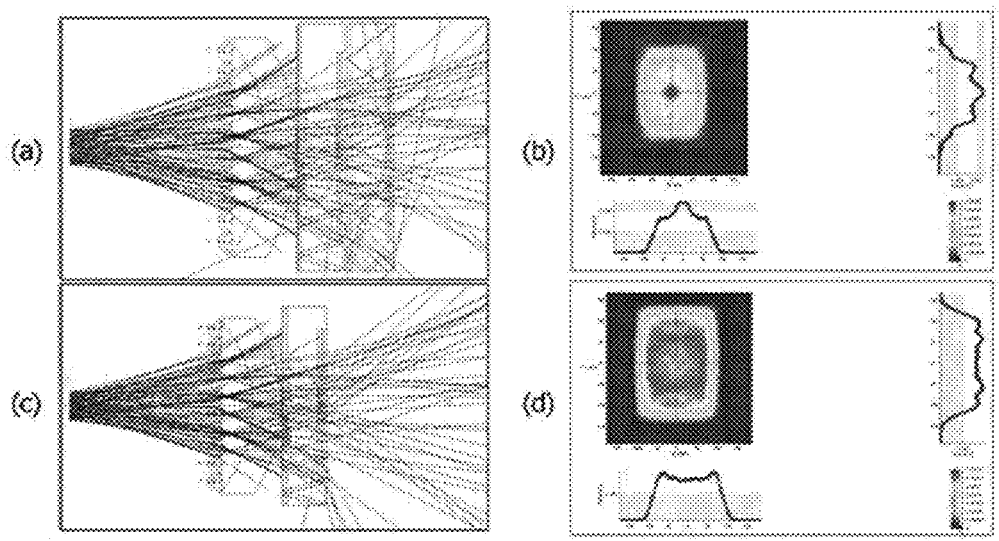
[FIG.14]
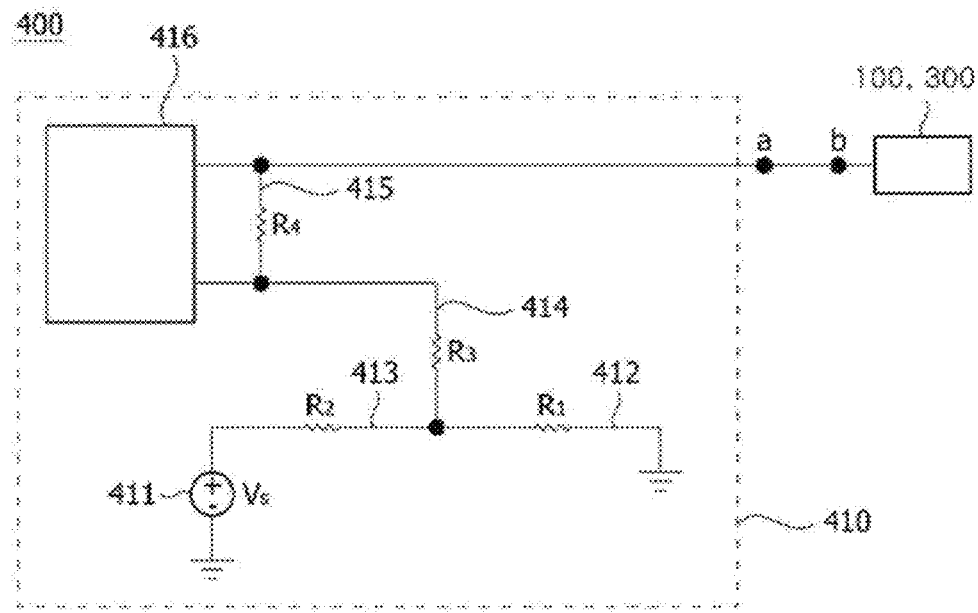

[FIG.15]
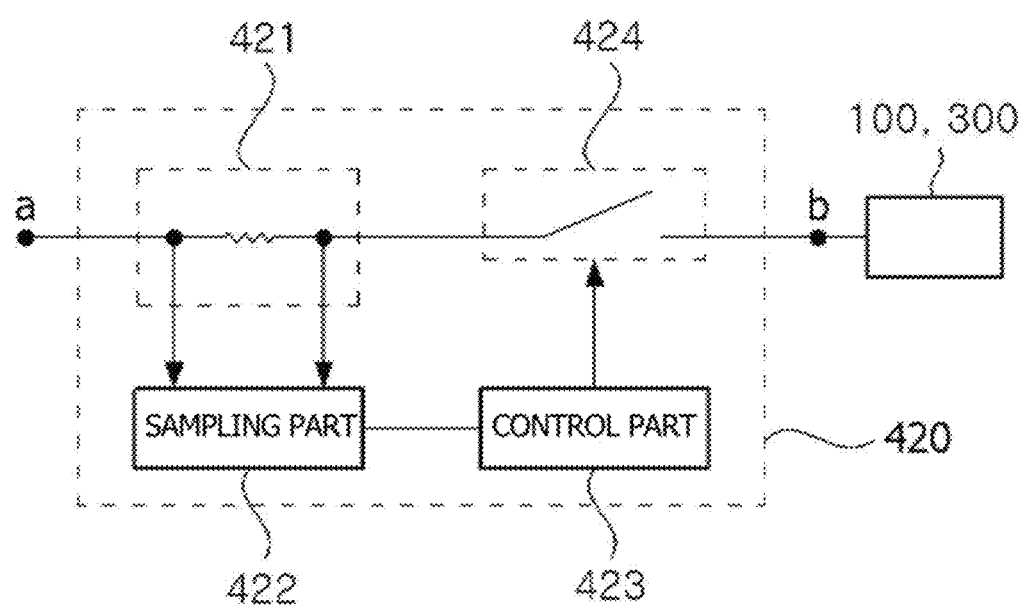

CAMERA MODULE

CROSS REFERENCE TO RELATED APPLICATIONS

This application is the National Phase of PCT International Application No. PCT/KR2019/007475, filed on Jun. 21, 2019, which claims priority under 35 U.S.C. 119(a) to Patent Application No. 10-2018-0072078, filed in the Republic of Korea on Jun. 22, 2018, all of which is hereby expressly incorporated by reference into the present application.

TECHNICAL FIELD

An embodiment relates to a camera module.

BACKGROUND ART

A technology for obtaining a three-dimensional (3D) image using an imaging device is developing. In order to obtain the 3D image, depth information (depth map) is required. The depth information is information representing a distance in space and represents perspective information of another point with respect to one point of a two-dimensional (2D) image.

One of methods of obtaining the depth information is a method of projecting infrared (IR) structured light onto an object and analyzing the light reflected from the object to extract depth information. According to an IR structured light method, there is a problem in that it is difficult to obtain depth resolution of a desired level on the basis of a moving object.

A time of flight (TOF) method is attracting attention as a technology which replaces the IR structured light method. According to the TOF method, a distance to an object is calculated by measuring a flight time, that is, a time in which light is emitted and reflected.

In the case of the TOF method, in order to accurately measure the distance to a subject, there is a problem in that an amount of light sufficient to illuminate a surface from a long distance should be secured.

DISCLOSURE

Technical Problem

An embodiment relates to a transmission part of a time of flight (ToF) camera module and is directed to providing a ToF camera module having a variable light intensity and illumination field of view.

Problems to be solved by the present invention are not limited to the above-described problems, and purposes and effects understood from solutions and embodiments which will be described below are also included.

Technical Solution

One aspect of the present invention provides a camera module including: a substrate; a light source disposed on the substrate to output light; a first optical member configured to scatter and output the light when the light is input; and a second optical member including a first liquid and a second liquid having a different refractive index from the first liquid, wherein an interface formed between the first liquid and the second liquid is changed according to an applied voltage, and the second optical member refracts and outputs the scattered light according to the interface when the scattered light is input.

The first optical member may be disposed between the light source and the second optical member, disposed to be spaced apart from the light source, and disposed in a stacked structure with the second optical member.

The second optical member may be disposed between the light source and the first optical member, disposed to be spaced apart from the light source, and disposed in a stacked structure with the first optical member.

The light source may include a vertical cavity surface emitting laser (VCSEL).

The first optical member may be implemented in a plate shape including a first surface receiving the light and a second surface outputting the scattered light, and a plurality of micro lenses may be disposed in the first surface by a predetermined pitch.

The second surface of the first optical member may be implemented as a flat surface or a spherical surface having a predetermined curvature.

The second optical member may include a cavity configured to accommodate the first liquid and the second liquid, and the cavity may include a first opening configured to receive the scattered light, and a second opening configured to output the refracted light.

A width of the first opening may be smaller than a width of the second opening.

The first liquid may include a conductive liquid, and the second liquid may include a non-conductive liquid.

The first liquid may be disposed at the first opening of the cavity, and the second liquid may be disposed between the first liquid and the second opening.

The camera module may further include a controller configured to control magnitudes of voltages applied to the light source and the second optical member.

The controller may include a gain control module configured to control the magnitude of the voltage input to the light source based on a temperature change of the camera module, and a safe module configured to control whether the voltage input to the light source based on output power of the light source is blocked.

The gain control module may include a power source configured to supply a direct current voltage, a first resistor of which a resistance value is changed according to a temperature change of a light receiving part configured to receive the light which is reflected from a subject and returns, a second resistor configured to distribute the direct current voltage supplied from the power source on the basis of the resistance value of the first resistor, and a converter configured to convert and output a magnitude of the direct current voltage distributed according to a predetermined conversion rate.

The safe module may include a detection part configured to detect power consumption of the light source and the second optical member, a sampling part configured to sample the detected power consumption, a control part configured to generate a switching control signal on the basis of the sampled voltage and a predetermined threshold value, and a switching part configured to perform switching according to the switching control signal.

Advantageous Effects

According to an embodiment, a field of illumination (FOI) of light can be variable according to a distance from a subject.

According to the embodiment, intensity of light can be variable according to a distance from a subject.

Various useful advantages and effects of the present invention are not limited to the above and can be relatively easily understood in a process of describing exemplary embodiments of the present invention.

DESCRIPTION OF DRAWINGS

FIG. 1 illustrates a camera module according to an embodiment of the present invention.

FIGS. 2 to 4 are views illustrating embodiments of an arrangement structure of a first optical member and a second optical member according to the embodiment of the present invention.

FIG. 5 is a view illustrating a light source according to the embodiment of the present invention.

FIG. 6 is a view illustrating the first optical member according to the embodiment of the present invention.

FIG. 7 is a view illustrating the first optical member and a barrel according to the embodiment of the present invention.

FIG. 8 is a cross-sectional view of the first optical member according to the embodiment of the present invention.

FIG. 9 is a view illustrating a second optical member according to the embodiment of the present invention.

FIG. 10 is a view for describing a light refraction mechanism of the second optical member according to the embodiment of the present invention.

FIG. 11 is a view for describing an optical output in the case in which an interface of the second optical member according to the embodiment of the present invention is convex.

FIG. 12 is a view for describing an optical output in the case in which an interface of the second optical member according to the embodiment of the present invention is concave.

FIG. 13 is a view for describing a case in which the second optical member according to the embodiment of the present invention is in plural.

FIG. 14 is a view for describing a gain control module according to the embodiment of the present invention.

FIG. 15 is a view for describing a safe module according to the embodiment of the present invention.

MODES OF THE INVENTION

Since the present invention may be variously changed and have various embodiments, particular embodiments will be exemplified and described in the drawings. However, it should be understood that the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element may be termed a second element, and similarly, a second element may be termed a first element without departing from the scope of the present invention. The term "and/or" includes any one or any combination among a plurality of associated listed items.

When predetermined components are mentioned as being "linked," or "connected" to other components, the components may be directly linked or connected to other components, but it should be understood that additional components may be present therebetween. On the other hand, when the predetermined components are mentioned as being "directly linked," or "directly connected" to other components, it should be understood that no additional components are present between the above-described components.

Terms used in the present application are used solely to describe the particular embodiments and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present application have meanings which are the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawing drawings, the same reference numerals are applied to the same or corresponding elements, and redundant description thereof will be omitted.

A camera module according to an embodiment of the present invention may be a time of flight (ToF) camera module capable of generating a three-dimensional (3D) depth map by measuring a distance to a subject. Specifically, configurations described in detail in the embodiment of the present invention may be configurations for a light emitting part of the ToF camera module.

Accordingly, configurations of the camera module according to the embodiment of the present invention will be described with reference to FIG. 1.

FIG. 1 illustrates the camera module according to the embodiment of the present invention.

As shown in FIG. 1, the camera module according to the embodiment of the present invention may include a substrate 20, a light source 100, a first optical member 200, a second optical member 300, and a housing 10.

First, the substrate 20 is a structure on which the light source 100 is mounted and may be, for example, a printed circuit board. In this case, the printed circuit board refers to a substrate on which a circuit pattern is formed, that is, a printed circuit board (PCB). Further, in the present invention, the printed circuit board may be formed as a flexible printed circuit board (FPCB) to secure a certain flexibility. In addition, the substrate 20 may be implemented as any one of a resin-based printed circuit board (PCB), a metal core PCB, a ceramic PCB, and an FR-4 board. Subsequently, the light source 100 outputs light. When an electric signal (a voltage) is applied, the light source 100 outputs the light according to the electric signal.

The light source 100 may be implemented as a light emitting device which emits light. The light emitting device may include a laser diode (LD), a vertical-cavity surface-emitting laser (VCSEL) diode, an organic light emitting diode (OLED), and a light emitting diode (LED). According to an embodiment of the present invention, when the light source 100 uses the VCSEL diode as a light emitting device, a manufacturing process may be simplified, and parallel signal processing may be easily performed through miniaturization and high integration, and power consumption may be reduced, but the present invention is not limited to the above-described embodiment.

The light source 100 may be implemented in a shape in which a plurality of light emitting devices are arrayed and may be implemented in a shape of a chip in which a plurality of light emitting devices are arrayed. The shape in which the light emitting elements are arrayed may be changed in design by those skilled in the art according to a purpose of the camera module according to the embodiment of the present invention.

The light source 100 may be disposed on one surface of the printed circuit board 20. The light source 100 may be electrically connected to the printed circuit board 20 and may receive power necessary to output light through the printed circuit board 20.

Subsequently, the first optical member 200 scatters and outputs the light input from the light source 100. The first optical member 200 may scatter the input light according to a predetermined scattering pattern. The first optical member 200 scatters the light and thus may enhance uniformity of luminance of the light output from the light source 100 and remove a hot spot to which the light is concentrated at a position where the light emitting device is located. That is, the first optical member 200 may scatter the input light and uniformly diffuse the output light over an entire surface.

The first optical member 200 is disposed on a front surface of the light source 100. In this case, the front surface of the light source 100 means one surface located in the direction in which the light is output from the light source 100. The first optical member 200 may be disposed to be spaced apart from the light source 100 by a predetermined distance. Design of the distance between the first optical member 200 and the light source 100 may be changed by those skilled in the art in consideration of use of the camera module, and the shape and type of the light source 100.

The first optical member 200 may be implemented in a plate shape including a first surface to which light is input and a second surface to which the scattered light is output. The first optical member 200 may be implemented as a spherical surface or a flat surface. Micro lenses are disposed on the first surface of the first optical member 200 by a predetermined pitch. In this case, the light input by adjusting an angle of light collected through the first surface according to a size, a curvature, a refractive index, and a pitch size of the micro lens is scattered and output through the second surface. Design of the size, the curvature, the refractive index, and the pitch size of the micro lens may be changed by those skilled in the art in consideration of the use of the camera module according to the embodiment of the present invention, an interval between the first optical member 200 and the light source 100, the shape and type of the light source 100, and the like.

Subsequently, the second optical member 300 refracts and outputs the incident light. In this case, the second optical member 300 may be a variable lens in which a refractive index of transmitted light is changed according to the magnitude of the applied voltage.

When the second optical member 300 is the variable lens, the second optical member 300 may include a first liquid implemented as a conductive liquid and a second liquid implemented as a non-conductive liquid. The second optical member 300 may vary a field of illumination (FOI) of output light through a change in curvature of an interface between the first liquid (conductive liquid) and the second liquid (non-conductive liquid).

The change in curvature of the interface formed by the first liquid and the second liquid may vary according to the magnitude of the voltage applied to the second optical member 300. Specifically, when the voltage is applied to the second optical member 300, an electrowetting phenomenon occurs in which a contact angle between the conductive liquid and an inner surface of the cavity coated with an insulator changes according to the magnitude of the voltage. Further, the curvature of the interface formed by the first liquid and the second liquid is changed by the electrowetting phenomenon.

The second optical member 300 is disposed on a front surface of the first optical member 200. Here, the front surface of the first optical member 200 means one surface located in the direction in which the first optical member 200 outputs the scattered light.

The substrate 20, the light source 100, the first optical member 200, and the second optical member 300 may be accommodated in the housing 10. The housing 10 may have an opening formed on a surface facing a surface on which the substrate 20 is disposed.

Subsequently, an arrangement structure of the light source 100, the first optical member 200, and the second optical member 300 according to the embodiment of the present invention will be described with reference to FIGS. 1 to 4. FIGS. 2 to 4 are views illustrating embodiments of an arrangement structure of the first optical member and the second optical member according to the embodiment of the present invention.

First, as shown in FIG. 1, the first optical member 200 may be disposed between the light source 100 and the second optical member 300. In this case, the first optical member 200 may be disposed to be spaced apart from the light source 100 at a predetermined interval. Further, the first optical member 200 may be disposed in a stacked structure with the second optical member 300. That is, the first optical member 200 and the second optical member 300 may be disposed in the housing 10 in a shape in which one surfaces thereof come into contact with each other. Accordingly, the light output from the light source 100 is scattered while passing through the first optical member 200, and the scattered light is refracted and output according to the interface formed by the first liquid and the second liquid while passing through the second optical member 300. Here, a separation distance between the first optical member 200 and the light source 100 may be set by those skilled in the art in consideration of the configurations of the camera module according to the embodiment of the present invention such as characteristics of the light source 100, the pitch of the micro lenses included in the first optical member 200, and the like.

Subsequently, as shown in FIG. 2, the first optical member 200 may be disposed between the light source 100 and the second optical member 300. Further, the first optical member 200 may be disposed to be spaced apart from the light source 100 at a predetermined interval. In this case, the first optical member 200 may be disposed at a position spaced apart from the second optical member 300 at a predetermined interval. That is, all of the light source 100, the first optical member 200, and the second optical member 300 may be disposed in the housing 10 in a spaced state. Accordingly, the light output from the light source 100 is scattered while passing through the first optical member 200, and the scattered light is refracted and output according to the interface formed by the first liquid and the second liquid while passing through the second optical member 300. Here, the separation distance between the first optical member 200 and the light source 100 and a separation distance between the first optical member 200 and the second optical member 300 may be set by those skilled in the art in consideration of the configurations of the camera module according to the embodiment of the present invention such as the characteristics of the light source 100, the pitch of the micro lenses included in the first optical member 200, and the like.

Subsequently, as shown in FIG. 3, the second optical member 300 may be disposed between the light source 100 and the first optical member 200. In this case, the second optical member 300 may be disposed to be spaced apart from the light source 100 at a predetermined interval. Further, the second optical member 300 may be disposed in a stacked structure with the first optical member 200. That is, the second optical member 300 and the first optical member 200 may be disposed in the housing 10 in a shape in which one surfaces thereof come into contact with each other. Accordingly, the light output from the light source 100 is refracted according to the interface formed by the first liquid and the second liquid while passing through the second optical member 300, and the refracted light is scattered and output while passing through the first optical member 200. Here, the separation distance between the second optical member 300 and the light source 100 may be set by those skilled in the art in consideration of the configurations of the camera module according to the embodiment of the present invention such as the characteristics of the light source 100, the pitch of the micro lenses included in the first optical member 200, and the like.

Subsequently, as shown in FIG. 4, the second optical member 300 may be disposed between the light source 100 and the first optical member 200. Further, the second optical member 300 may be disposed to be spaced apart from the light source 100 at a predetermined interval. In this case, the second optical member 300 may be disposed at a position spaced apart from the first optical member 200 at a predetermined interval. That is, all of the light source 100, the first optical member 200, and the second optical member 300 may be disposed in the housing 10 in the spaced state. Accordingly, the light output from the light source 100 is refracted according to the interface formed by the first liquid and the second liquid while passing through the second optical member 300, and the refracted light is scattered and output while passing through the first optical member 200. Here, the separation distance between the first optical member 200 and the light source 100 and the separation distance between the first optical member 200 and the second optical member 300 may be set by those skilled in the art in consideration of the configurations of the camera module according to the embodiment of the present invention such as the characteristics of the light source 100, the pitch of the micro lenses included in the first optical member 200, and the like.

Hereinafter, the light source, the first optical member, and the second optical member included in the camera module according to the embodiment of the present invention will be described with reference to FIGS. 5 to 13.

FIG. 5 is a view illustrating the light source according to the embodiment of the present invention.

The light source 100 may have a shape in which a plurality of light emitting devices are disposed at a predetermined interval and pattern and may be implemented in a shape of a chip in which the plurality of light emitting devices are arrayed. The light source 100 implemented in the shape of the array chip may be disposed on one surface of the substrate.

According to the embodiment of the present invention, as shown in FIG. 5, the light source 100 may be implemented as an array pattern in which light emitting devices disposed in odd-numbered columns (rows) and light emitting devices disposed in even-numbered columns (rows) are arranged to be shifted at predetermined intervals. That is, when the array pattern is displayed in coordinates, the light emitting devices may be disposed at coordinate positions of [(1,1) (1,3), . . . , (2,2), (2,3), . . . , (3,1), (3,3), . . . ]. The array pattern illustrated in FIG. 5 is one embodiment and may be implemented as various array patterns in consideration of the use or structure of the camera module.

FIG. 6 is a view illustrating the first optical member according to the embodiment of the present invention.

FIG. 6A is a plan view (top view) of the first optical member, and FIG. 6B is a side view of the first optical member.

As described above, the first optical member 200 serves to scatter the light output from the light source or the light refracted by the second optical member. The second optical member may be implemented as an optical diffuser.

The first optical member 200 may have a configuration in which a diffuser which scatters light is mixed with a transparent material through which light may be transmitted. That is, the diffuser included in the first optical member 200 scatters incident light to remove hot spots. In this case, the transparent material may be polycarbonate.

The first optical member 200 may be implemented in a plate shape including a first surface on which light is incident and a second surface which outputs the scattered light. In the first optical member 200, both the first and second surfaces may each be implemented as a flat surface, or as shown in FIG. 6B, at least one of the first and second surfaces may be implemented as a spherical surface having a predetermined curvature.

Meanwhile, as shown in FIG. 6, the first optical member 200 may include a plurality of micro lenses disposed on the first surface on which the light is incident by a predetermined pitch. The light passing through the plurality of micro lenses may change a shape of light distribution and thus may more efficiently remove the hot spots. According to the embodiment of the present invention, as shown in FIG. 6, the micro lenses may be disposed on the first surface of the first optical member 200 in a matrix shape having a predetermined pitch. As another example, the micro lenses may be disposed on the first surface of the first optical member 200 by a predetermined pitch corresponding to the array pattern of the light emitting devices included in the light source. For example, the micro lenses may be disposed in the same manner as the array pattern of the light emitting devices or may be disposed on the first surface of the first optical member 200 so that one micro lens corresponds to each of a predetermined number of light emitting devices. Arrangement of the micro lenses may be changed in design by those skilled in the art in consideration of the structure of the light source.

FIG. 7 is a view illustrating the first optical member and a barrel according to the embodiment of the present invention.

FIG. 7A is a plan view (top view) of the first optical member accommodated in the barrel, and FIG. 7B is a side view of the first optical member accommodated in the barrel.

As shown in FIG. 7, the first optical member 200 may be coupled to a barrel 201. The barrel 201 is formed in a shape surrounding a side surface of the first optical member, and openings are formed in surfaces corresponding to the first and second surfaces of the first optical member 200. Accordingly, light may be input and output through the openings of the barrel 201. The barrel 201 is formed in a structure which may be combined with the housing shown in FIG. 1. In FIG. 7, the barrel 201 is illustrated in a shape surrounding the micro lenses disposed outside the first optical member 200 but is not limited thereto and may be implemented in a shape not surrounding the micro lenses FIG. 8 is a cross-sectional view of the first optical member according to the embodiment of the present invention.

According to the embodiment of the present invention, as shown in FIG. 8, the first optical member may be implemented in a shape accommodated in the barrel. Looking specifically at the arrangement of each configuration, a thickness LT of the first optical member is formed to be smaller than a thickness BT of the barrel. In this case, the first optical member may be disposed at a predetermined distance LBG from upper and lower surfaces of the barrel. In this case, there is an advantage of preventing damage such as scratches from being applied to the surface of the first optical member accommodated therein due to the barrel.

A diameter LDO of an opening of the lower surface of the barrel is formed larger than a diameter LUO of an opening of the upper surface. Accordingly, a lower thickness BBT of the barrel may be thicker than an upper thickness BTT of the barrel.

In the first optical member, the plurality of micro lenses disposed on the first surface may be formed according to a predetermined curvature LS2R (x,y), a predetermined conic constant LS2K, and a predetermined pitch LS2P. Further, the second surface of the first optical member may be formed as a spherical surface according to a predetermined curvature LS1R. In this case, the curvature of the second surface of the first optical member may be greater than that of the micro lens.

The light source may be disposed to be spaced apart from the first optical member (disposed to be spaced apart from the first surface of the first optical member by FBL and from the second surface of the first optical member by TTL), and may output light with a specific apodization (APO(x,y)), and the first optical member may output light in a specific field of illumination (FOI(x,y)). In this case, since the first optical member scatters the light, an angle of the FOI may be formed larger than an angle of the apodization.

FIG. 9 is a view illustrating the second optical member according to the embodiment of the present invention.

FIG. 9A is a top view of the second optical member according to one embodiment, and FIG. 9B is a cross-sectional view of the second optical member according to one embodiment.

Referring to FIG. 9, the second optical member 300 may include two different liquids, a first plate 301, and an electrode. Two liquids 302 and 303 included in the second optical member 300 may include a conductive liquid and a non-conductive liquid. The first plate 301 may include a cavity 305 in which the conductive liquid and the non-conductive liquid are disposed. The sidewall surface of the cavity 305 may include an inclined surface. The electrode may be disposed on the first plate 301 and may be disposed on the first plate 301 or under the first plate 301. The second optical member 300 may further include a second plate 306 which may be disposed on (under) the electrode. Further, the liquid lens may further include a third plate 307 which may be disposed under (on) the electrode. As shown in the drawing, one example of the second optical member 300 may include an interface 304 formed by two different liquids 302 and 303. Further, the second optical member 300 may include at least one substrate 311 or 312 which supplies a voltage to the second optical member 300. Here, the substrates 311 and 312 may refer to a common electrode connection substrate 44 and an individual electrode connection substrate 41, respectively. An edge portion or a corner portion of the second optical member 300 may have a thickness smaller than a center portion of the second optical member 300. A part of a corner of the second plate or the third plate may escape to expose a part of the electrode disposed on the first plate.

The second optical member 300 may include two different liquids, for example, a conductive liquid 303 and a non-conductive liquid 302, and a curvature and a shape of the interface 304 formed by the two liquids may be adjusted by a driving voltage supplied to the second optical member 300. The driving voltage supplied to the second optical member 300 may be transmitted through a first substrate 312 and a second substrate 311. The first substrate 312 may transmit four separate driving voltages, and the second substrate 311 may transmit one common voltage. The common voltage may include a direct current (DC) voltage or an alternative current (AC) voltage. When the common voltage is applied in a form of a pulse, a pulse width or duty cycle may be constant. The voltages supplied through the second substrate 311 and the first substrate 312 may be applied to a plurality of electrodes 308 and 309 exposed to edges of the second optical member 300, respectively. A conductive epoxy may be disposed between the electrode and the substrate, and the electrode and the substrate may be bonded and energized through the conductive epoxy.

Further, the second optical member 300 may include the first plate 301 located between the third plate 307 and the second plate 306 including a transparent material and including an opening region having a predetermined inclined surface.

The second plate 306 may have a quadrangular shape having a first width D1. The second plate 306 abuts and adheres to the first plate 301 in a bonding area around an edge, and the first plate 301 may have an inclined surface and may include a diameter D2 of a surrounding region 320 larger than a diameter D3 of a wide opening region. The surrounding region 320 may be a region overlapping an upper surface of the first plate 301 and the liquid in a vertical direction or in a direction parallel to an optical axis. A part of the first electrode 308 disposed on the first plate 301 may be exposed so that a part of an electrode pattern formed on the first plate 301 may be exposed to the conductive liquid. The second plate 306 may have the diameter D2 larger than the diameter D3 of the wide opening region of the first plate 301 according to the embodiment.

Further, the second optical member 300 may include the third plate 307, the second plate 306, and the cavity 305 determined by the opening region of the first plate 301. Here, the cavity 305 may be filled with two liquids 302 and 303 having different properties (for example, a conductive liquid and a non-conductive liquid), and the interface 304 may be formed between the two liquids 302 and 303 having the different properties.

Further, at least one of the two liquids 302 and 303 included in the second optical member 300 may have conductivity, and the second optical member 300 may further include an insulating layer 310 disposed on an inclined surface in which two electrodes 308 and 309 disposed on and under the first plate 301, and the liquid having conductivity may come into contact with each other. The insulating layer 310 may be disposed between an inner inclined surface of the first plate 301 and the liquids 302 and 303. Here, the insulating layer 310 may cover one of the two electrodes 308 and 31309 (for example, the second electrode 309), and expose a part of the other electrode (for example, the first electrode 308) so that electrical energy may be applied to the conductive liquid (for example, 303). Here, the first electrode 308 may include at least one electrode sector, and the second electrode 309 may include two or more electrode sectors. For example, the second electrode 31309 may include a plurality of electrode sectors sequentially disposed in a clockwise direction around an optical axis.

One or two or more substrates 311 and 312 for transmitting a driving voltage may be connected to the two electrodes 308 and 309 included in the second optical member 300. A focal length of the second optical member 300 may be adjusted while a curvature, inclination, and the like of the interface 304 formed in the second optical member 300 are changed in response to the driving voltage.

Meanwhile, the first plate 301 may include an opening region and may include a wide opening region and a narrow opening region by the inner inclined surface of the first plate 301. The diameter D3 of the wide opening region may vary depending on a field of view (FOV) required for a liquid lens or a role of the liquid lens in the camera device. The opening region may have a shape of a hole having a circular cross section, and the inclined surface of the opening region may have a slope in the range of 55 to 65 degrees. The interface 304 formed by the two liquids may move along the inclined surface of the opening region by the driving voltage.

FIG. 10 is a view for describing a light refraction mechanism of the second optical member according to the embodiment of the present invention.

As shown in FIG. 10, the first liquid is located on the second liquid, and the two liquids have different properties and refractive indexes. Accordingly, the two liquids may form an interface. The interface may move along an inner wall of the cavity by the voltage applied to the electrode. Accordingly, as shown in FIG. 10A, the second optical member has a negative (−) diopter in an initial state in which the voltage is not applied to the electrode. Further, as shown in FIG. 10B, as the voltage is applied to the electrode, the second optical member may have a positive (+) diopter. That is, the interface is curved downward from an initial state, and the second optical member may function as a concave lens as shown in FIG. 10A. As the voltage is applied to the electrode, the interface is gradually curved upward, and thus the second optical member may function as a convex lens as shown in FIG. 10B. Further, a curvature radius of the interface which is convex downward from the initial state may be larger than a curvature radius of the interface which is convex upward in a state in which the maximum voltage is applied to the electrode.

FIG. 11 is a view for describing an optical output in the case in which the interface of the second optical member according to the embodiment of the present invention is convex, and FIG. 12 is a view for describing an optical output in the case in which the interface of the second optical member according to the embodiment of the present invention is concave.

As shown in FIG. 11, when the interface of the second optical member 300 has a convex shape with respect to a light input surface, the light is spread. That is, the light may be refracted at an angle greater than an angle of light output from the light source 100 with respect to the optical axis, and thus may be output toward the subject.

On the other hand, as shown in FIG. 12, when the interface of the second optical member 300 has a concave shape with respect to the light input surface, the light is collected. That is, the light may be refracted at an angle smaller than the angle of light output from the light source 100 with respect to the optical axis, and thus may be output toward the subject.

As shown in FIG. 11, when the light is refracted and output at the angle greater than the angle of the light output from the light source 100, there is an advantage in that a light area is widened. Accordingly, a ToF camera may obtain depth information of more subjects. However, since intensity of the light is relatively weak and a reach distance is short, the ToF camera may be disadvantageous in obtaining the depth information of a subject located at a far distance.

On the other hand, as shown in FIG. 12, when the light is refracted and output at the angle smaller than the angle of the light output from the light source 100, there is an advantage in that the intensity of the light is relatively strong and the reach distance increases. Accordingly, the ToF camera may obtain accurate depth information of the subject located at the far distance. However, since the light area decreases, the ToF camera may be disadvantageous in an obtaining amount of the depth information.

Accordingly, the camera module according to the embodiment of the present invention may optimize obtaining depth information by changing the interface between the first liquid and the second liquid according to the distance to the subject.

FIG. 13 is a view for describing a case in which the second optical member according to the embodiment of the present invention is in plural.

FIG. 13A shows an optical path when the number of second optical members is two, and FIG. 13B shows an illuminance plane in FIG. 13A. FIG. 13C shows an optical path when the number of second optical member is one, and FIG. 13D shows an illuminance plane in FIG. 13C.

As shown in FIG. 13, the camera module according to the embodiment of the present invention may include two or more second optical members 300. That is, as shown in FIG. 13A, when the camera module is composed of the two second optical members 300, light passing through the first surface of the first optical member 200 on which the micro lens is disposed is output after being scattered by the diffuser. Further, after the light spreads primarily while passing through the primary second optical member 300 having a convex interface with respect to the first surface, the light spreads secondarily while passing the secondary second optical member 300 having a convex interface with respect to the first surface).

When comparing FIGS. 13A and 13B consisting of two second optical members 300 and FIGS. 13C and 13BD consisting of one second optical member 300, it may be seen that an area to which light is irradiated is reduced but a degree to which the light is concentrated is higher in the case in which the camera module is composed of two second optical members 300, than in the case in which the camera module is composed of one second optical member 300. Accordingly, since the number of the second optical members 300 is set in consideration of the distance of the subject to be imaged by the camera module, it is possible to obtain high quality depth information.

Hereinafter, a controller configuration of the camera module according to the embodiment of the present invention will be described through FIGS. 14 and 15.

The camera module according to the embodiment of the present invention may further include a controller. The controller may be implemented by including a central processing unit (CPU) and a memory.

First, the controller may include a gain control module 410 which controls a magnitude of a voltage input to the light source based on a temperature change. The gain control module 410 may control a magnitude of a voltage applied to the second optical member and thus may control a change in the interface formed by the first liquid and the second liquid. In this case, the controller may control the magnitude of the voltage applied to the second optical member based on distance information from the subject.

Further, the controller may include a safe module 420 which controls whether the voltage input to the light source is blocked based on power consumption of the light source. The safe module 420 may control the voltage applied to the light source. In the case of the ToF camera, distance information is obtained by outputting infrared (IR) light to the subject and receiving the light which is reflected and returns, and in this case, damage may occur to the subject according to intensity of the IR light. Specifically, when the subject is a human, there is a risk of blindness or burns in the case in which high intensity IR light is irradiated to eyes or skin. Accordingly, the controller may control whether the voltage is applied by predicting an occurrence of intensity of a dangerous level based on an amount of power consumed by the light source.

FIG. 14 is a view for describing a gain control module according to the embodiment of the present invention.

As shown in FIG. 14, the gain control module 410 may include a power source 411, a first resistor 412, a second resistor 413, a third resistor 414, a fourth resistor 415, and a converter 416.

The power supply 411 supplies a direct current voltage. The power supply 411 may supply a voltage of +3.3 [V], and the magnitude of the supplied voltage may be set differently according to the camera module.

The first resistor 412 is a device of which a resistance value changes according to a temperature change of the camera module and may be implemented as a negative temperature coefficient (NTC) resistor. Specifically, the resistance value of the first resistor 412 may change according to a temperature change of the light receiving part of the camera module. Specifically, the camera module receives the reflected light through the light receiving part when the light output through the light source, the first optical member, and the second optical member is reflected by the subject and returns. In this case, since the intensity of the returned light becomes strong when the distance between the camera module and the subject decreases, a temperature of the light receiving part which receives the light increases. Accordingly, the resistance value of the first resistor 412 may change according to this temperature change.

The second resistor 413 serves to distribute the direct current voltage supplied by the power source 411 based on the resistance value of the first resistor 412. The value of the second resistor 413 is preset as a fixed value.

The third resistor 414 may be used to supply the voltage distributed based on the first resistor 412 and the second resistor 413 to the converter 416. The fourth resistor 415 may be used by the converter 416 to apply the voltage to the light source and the second optical member.

The converter 416 controls the magnitude of the voltage supplied to the light source and the second optical member based on the distributed voltage. The converter 416 may be implemented as a DC/DC converter and controls the magnitude of the voltage supplied to the second optical member according to a preset ratio relationship. For example, assume that a ratio of the input voltage and the output voltage is set to 3:2. In this case, when the input voltage is 1.5 [V], a voltage of 1 [V] is transmitted to the light source and the second optical member according to a preset 3:2 ratio.

When a circuit diagram of the gain control module 410 is described with reference to FIG. 14, a first end of the power source 411 is grounded. A first end of the first resistor 412 is grounded. A first end of the second resistor 413 is connected to a second end of the power source 411, and a second end of the second resistor 413 is connected to a second end of the first resistor 412. A first end of the third resistor 414 is connected to the second end of the first resistor 412 and the second end of the second resistor 413. A first end of the fourth resistor 415 is connected to a second end of the third resistor 414. A first end of the converter 416 is connected to the second end of the third resistor 414 and the first end of the fourth resistor 415. A second end of the converter 416 is connected to a second end of the fourth resistor 415 and may be connected to the light source and the second optical member through nodes a and b.

FIG. 15 is a view for describing a safe module according to the embodiment of the present invention.

As shown in FIG. 15, the safe module 420 may include a detection part 421, a sampling part 422, a control part 423, and a switching part 424.

First, the detection part 421 detects power applied to the light source and the second optical member. Specifically, the detection part 421 may detect the power applied to the light source and the second optical member through a resistor disposed between the node a and the node b.

Subsequently, the sampling part 422 samples the detected power. Specifically, the sampling part 422 samples power information detected in an analog form as digital information.

Subsequently, the control part 423 generates a switching control signal based on the sampled voltage and a threshold value. In this case, the threshold value may be set to 0.05 [mW] according to a Class I standard of LASER classification. For example, when the power consumption of the light source rapidly increases due to an external or internal error of the camera module and exceeds the threshold value, the control part 413 may generate a switching control signal to turn off a switch.

Subsequently, the switching part 424 performs switching according to the switching control signal.

Although the above-described embodiments are mainly described with reference to the embodiments of the present invention, the above are only exemplary, and it should be understood that those skilled in the art may variously perform modifications and applications within the principle of the embodiments. For example, elements specifically shown in the embodiments may be modified. Further, differences related to modifications and changes should be understood as being included in the scope of the present invention defined in the appended claims.

The invention claimed is:

1. A camera module comprising:
   a substrate;
   a light source disposed on the substrate to output light;
   a first optical member configured to scatter and output the light when the light is input; and
   a second optical member including a first liquid and a second liquid having a different refractive index from the first liquid, wherein an interface formed between the first liquid and the second liquid is changed according to an applied voltage, and the second optical member refracts and outputs the scattered light according to the interface when the scattered light is input, wherein the light source, the first optical member, and the second optical member are vertically stacked to overlap each other.

2. The camera module of claim 1, wherein the first optical member is disposed between the light source and the second optical member, and the first optical member is disposed to be spaced apart from the light source.

3. The camera module of claim 1, wherein the second optical member is disposed between the light source and the first optical member, and second optical member is disposed to be spaced apart from the light source.

4. The camera module of claim 1, wherein:
the first optical member is implemented in a plate shape including a first surface receiving the light and a second surface outputting the scattered light;
a plurality of micro lenses are disposed in the first surface of the first optical member by a predetermined pitch; and
the second surface of the first optical member is implemented as a flat surface or a spherical surface having a predetermined curvature.

5. The camera module of claim 1, wherein:
the second optical member includes a cavity configured to accommodate the first liquid and the second liquid;
the cavity includes a first opening configured to receive the scattered light, and a second opening configured to output the refracted light; and
a width of the first opening is smaller than a width of the second opening.

6. The camera module of claim 5, wherein:
the first liquid includes a conductive liquid; and
the second liquid includes a non-conductive liquid.

7. The camera module of claim 6, wherein:
the first liquid is disposed at the first opening of the cavity; and
the second liquid is disposed between the first liquid and the second opening.

8. A camera module comprising:
a substrate;
a light source disposed on the substrate to output light;
a first optical member configured to scatter and output the light when the light is input;
a second optical member including a first liquid and a second liquid having a different refractive index from the first liquid, wherein an interface formed between the first liquid and the second liquid is changed according to an applied voltage, and the second optical member refracts and outputs the scattered light according to the interface when the scattered light is input; and
a controller configured to control magnitudes of voltages applied to the light source and the second optical member,
wherein the controller includes a gain control module configured to control the magnitude of the voltage input to the light source based on a temperature change of the camera module, and a safe module configured to control whether the voltage input to the light source based on output power of the light source is blocked.

9. The camera module of claim 8, wherein the gain control module includes a power source configured to supply a direct current voltage, a first resistor of which a resistance value is changed according to a temperature change of a light receiving part configured to receive the light which is reflected from a subject and returns, a second resistor configured to distribute the direct current voltage supplied from the power source on the basis of the resistance value of the first resistor, and a converter configured to convert and output a magnitude of the direct current voltage distributed according to a predetermined conversion rate.

10. The camera module of claim 8, wherein the safe module includes a detection part configured to detect power consumption of the light source and the second optical member, a sampling part configured to sample the detected power consumption, a control part configured to generate a switching control signal on the basis of the sampled voltage and a predetermined threshold value, and a switching part configured to perform switching according to the switching control signal.

* * * * *